United States Patent

Demus et al.

[11] 4,344,856
[45] Aug. 17, 1982

[54] CRYSTALLINE-LIQUID SUBSTITUTED 1,3-DIOXANES AND MIXTURES CONTAINING THEM

[75] Inventors: Dietrich Demus; Horst Zaschke, both of Halle; Hans-Mathias Vorbrodt, Quedlinburg; Horst Kresse; Wolfgang Weissflog, both of Halle, all of German Democratic Rep.

[73] Assignee: VEB Werk für Fernsehelektronik Berlin im VEB Kombinat Mikroelektronik, Berlin-Oberschoneweide, German Democratic Rep.

[21] Appl. No.: 110,857

[22] Filed: Jan. 10, 1980

Related U.S. Application Data

[63] Continuation-in-part of Ser. No. 102,944, Dec. 12, 1979.

[51] Int. Cl.³ ............... C09K 3/34; G02F 1/13; C07D 319/04
[52] U.S. Cl. ............... 252/299.61; 350/350 R; 549/372
[58] Field of Search ............ 260/340.7; 252/299, 252/408, 299.6, 299.61; 350/350 R, 350 S

[56] References Cited

U.S. PATENT DOCUMENTS 4,200,580  4/1980  Hsu ........................ 252/299

OTHER PUBLICATIONS

Nonemissive Electrooptic Displays, Chemical Composition and Display Performance; Demus, D., pp. 83–119, (1975).
Gray, C. W., et al., Liquid Crystals and Plastic Crystals, vol. 1, Ellis Horwood Ltd., London, pp. 100–152, (1974).
Jorkin, H., Mol. Cryst. Liq. Cryst., vol. 56 (left), pp. 279–281, (May 1980).

Primary Examiner—Teddy S. Gron
Attorney, Agent, or Firm—Jordan and Hamburg

[57] ABSTRACT

The invention concerns crystalline liquid substituted 1,3-dioxanes and compositions containing the same for use in electro-optical components, characterized by at least one compound of the general formula:

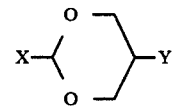

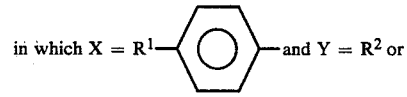

in which $X = R^1$ and $Y = R^2$ or

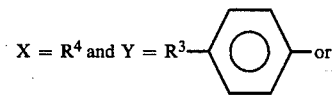
$X = R^4$ and $Y = R^3$ or

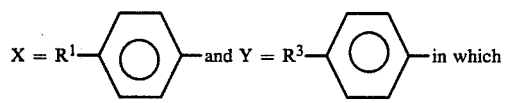
$X = R^1$ and $Y = R^3$ in which

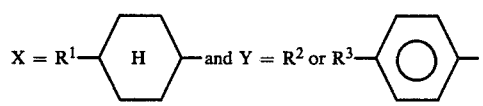
$X = R^1$ and $Y = R^2$ or $R^3$

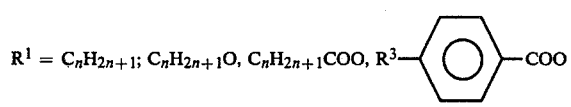
$R^1 = C_nH_{2n+1}$; $C_nH_{2n+1}O$, $C_nH_{2n+1}COO$, $R^3$—⟨⟩—COO

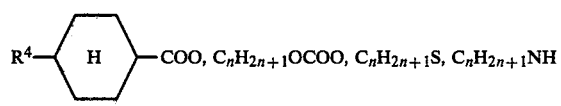
$R^4$—⟨H⟩—COO, $C_nH_{2n+1}OCOO$, $C_nH_{2n+1}S$, $C_nH_{2n+1}NH$ $C_nH_{2n+1}(CH_3)N$, CN, $NO_2$, F, Cl, Br, NC—CH=CH,

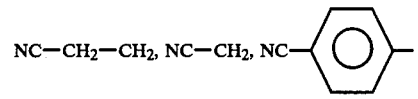

NC—CH_2—CH_2, NC—CH_2, NC—⟨⟩—

$R^2 = C_nH_{2n+1}$; OH, CN, $OR^4$, $OCOR^4$, $OCOOR^4$,

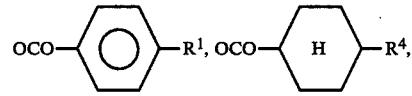

OCO—⟨⟩—$R^1$, OCO—⟨H⟩—$R^4$,

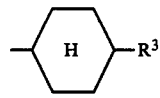

—⟨H⟩—$R^3$ $R^3 = C_nH_{2n+1}$; $C_nH_{2n+1}O$, Cl, Br, CN, $NO_2$, and where $R^4 = C_nH_{2n+1}$ and n=1 to 10.

3 Claims, No Drawings

CRYSTALLINE-LIQUID SUBSTITUTED 1,3-DIOXANES AND MIXTURES CONTAINING THEM

CROSS-REFERENCE TO RELATED APPLICATION

This application is a continuation-in-part application of my copending application Ser. No. 102,944, filed Dec. 12, 1979 and entitled Liquid Crystalline Substituted 1,3 Dioxanes and Mixtures Containing These.

The invention concerns liquid-crystalline substituted 1,3-dioxanes and compositions containing the same for electro-optical arrangements for modulation of incident or transmitted light as well as for display of symbols, drawings and pictures.

It is known, that on account of their optical and dielectric anisotropy, various electro-optical effects are observable in nematic liquid crystals, which effects can be used in the preparation of electro-optical components. Cf., e.g., G. Meier, E. Seekmann, J. G. Grabmeier, *Applications of Liquid Crystals*, Springer-Verlag Berlin-Heidelberg-New York 1975; M. Tobias, *International Handbook of Liquid Crystal Displays* 1975–76, Ovum Ltd., London 1976.

Of particular interest are components based on twisted nematic layers, the twisting of which disappears through the effects of the electric field, and in which light-dark effects are observed. The addition of nematic substances with positive dielectric anisotropy, found in compounds with a strong longitudinal component of the dipole moment, is considered necessary for such components. In the use of substances with negative dielectric anisotropy, dynamic scattering effects are observed, which are also suitable for application in electro-optical components.

The substances of the prior art for electro-optical components have certain disadvantages, in that they have too high melting points or too low clarifying points or limited stability with respect to thermal charging, the influence of light and chemicals or electric fields, or a disturbing self-coloration.

It is a goal of the invention to provide nematic liquid crystalline substances with desirable properties with respect to melting and clarifying points, stability with respect to thermal charging, the influences of light and chemicals as well as electric fields and a lack of coloration, and to provide processes for their preparation.

The goal is achieved through the invention by the provision of novel, nematic, liquid crystalline substances and previously unknown processes for their synthesis.

SUMMARY OF THE INVENTION

It has been found, that crystalline-liquid 2,5-disubstituted derivatives of 1,3-dioxane of the general formula:

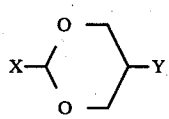

where

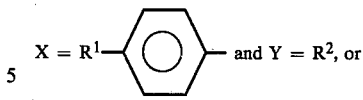

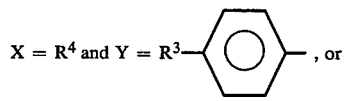

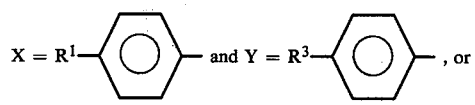

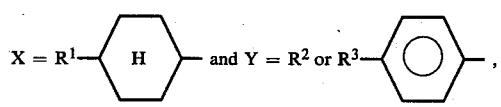

and where $R^1 = C_nH_{2n+1}$; $C_nH_{2n+1}O$; $C_nH_{2n+1}COO$;

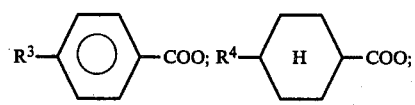

$C_nH_{2n+1}OCOO$; $C_nH_{2n+1}S$; $C_nH_{2n+1}NH$; $C_nH_{2n+1}(CH_3)N$;

$CN$; $NO_2$; $F$; $Cl$; $Br$; $NC-CH=CH$; $NC-CH_2-CH_2$;

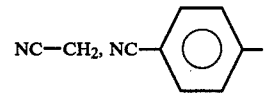

$R^2 = C_nH_{2n+1}$; $OH$; $CN$; $OR^4$; $OCOR^4$; $OCOOR^4$;

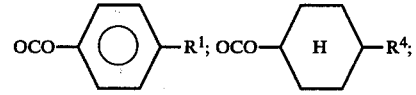

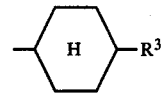

$R^3 = C_nH_{2n+1}$; $C_nH_{2n+1}O$; $Cl$; $Br$; $CN$; $NO_2$;
$R^4 = C_nH_{2n+1}$ with n=1 to 10, can be prepared through reactions of aldehydes, substituted benzaldehydes and acetals thereof with glycerine or 2-substituted propan-1,3-diols in organic solvents in the presence of an acid catalyst according to the general scheme;

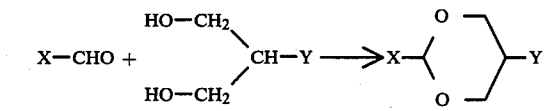

and which if desired can be esterified or etherified.

According to the invention, the new compounds are used in compositions containing at least one of the substances of the invention. Of particular advantage are mixtures of the substances of the invention with each other, with other crystalline substances or with non-crystalline liquid substances.

The advantages of the substances of the invention include their low melting points with high clarification points, and their stability with respect to heat, light, chemicals and electric fields. In particular, the substances with three rings exhibit very suitable properties, in increasing the clarification point of mixtures.

DETAILED DESCRIPTION OF THE PREFERRED EMBODIMENTS

The invention may be better understood through the following examples.

EXAMPLE 1

Preparation of 2-alkyl-propan-1,3-diols and 2-[4-substituted-phenyl]-propan-1,3-diols In a 2 l three-neck flask 21 g (0.5 mol) LiAlH$_4$ is suspended in 1 l absolute ether. With cooling and vigorous stirring, 1 mol n-alkyl malonic ester or 1 mol 4-substituted phenyl malonic ester with an equivalent volume of absolute ether is added slowly and then stirred an additional 2 hours at room temperature. Finally, the solution is carefully mixed with 100 ml ice water. The resulting residue (Al(OH)$_3$, LiOH) is dissolved through the addition of 700 ml 10% H$_2$SO$_4$. The organic phase is separated, the aqueous phase washed twice with ether, and the combined organic phases washed with 2% NaHCO$_3$ solution and water. After drying with Na$_2$SO$_4$, the solvent is removed under vacuum and the residue is fractionally distilled.

Examples are given in Tables 1 and 2.

TABLE 1

$C_nH_{2n+1}-CH(CH_2OH)_2$

| n | Yield (%) | Boiling point (°C.)/mm Hg |
|---|---|---|
| 3 | 63 | 92–93/2.5 |
| 4 | 69 | 107–110/2 |
| 5 | 65 | 125–126/2.5 |
| 6 | 73 | 133–136/2.5 |
| 7 | 75 | S: 28–30 (petrol/ether) |
| 8 | 74 | S: 44–46 (petrol/ether) |

S = Solidification point

TABLE 2

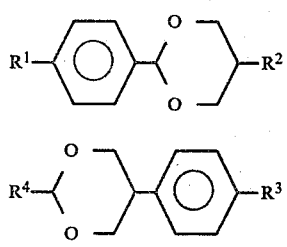

| R | Yield (%) | S (°C.) |
|---|---|---|
| C$_6$H$_{13}$ | 75 | 72–74 |
| C$_4$H$_9$O | 89 | 70–72 |

EXAMPLE 2

Preparation of the compounds 1, 2 and 3

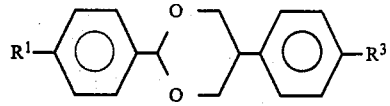

0.1 Mol aldehyde or 0.1 Mol substituted benzaldehyde or the acetal thereof and 0.11 Mol 2-alkyl-propan-1,3-diol or 0.12 Mol glycerine or 0.11 Mol 2-[4-substituted-phenyl]-propan-1,3-diol in 150 ml abs. benzene, chloroform, methylene chloride, carbon tetrachloride or toluene is heated in the presence of 100 mg p-toluene sulfonic acid or AlCl$_3$, SbCl$_5$, TiCl$_4$ or 2 ml of a mineral acid (HCl, H$_2$SO$_4$, H$_3$PO$_4$) under stirring with a water separator until the completion of the reaction. After cooling, the reaction mixture is washed with 2% NaHCO$_3$ solution and water, and the residue is dried over Na$_2$SO$_4$. The solvent is removed by rotary evaporation and the residue recrystallized from methanol. The yields approach between about 80–100% of theory. Examples are provided in Tables 3, 4 and 5.

In the tables, K=crystalline solid, S$_A$ and S$_B$=smectic A and B, N=nematic, I=isotropic liquid.

TABLE 3

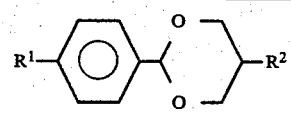

| Compound | R$^1$ | R$^2$ | K | S$_A$ | N | I |
|---|---|---|---|---|---|---|
| 1.1 | HO | C$_7$H$_{15}$ | .107–109 | — | — | . |
| 1.2 | C$_4$H$_9$ | C$_3$H$_7$ | . | S$_B$ 26 | — | . |
| 1.3 | C$_3$H$_7$O | C$_4$H$_9$ | . 43 | — | (. 25) | . |
| 1.4 | C$_4$H$_9$O | C$_4$H$_9$ | . 44 | — | (. 40) | . |
| 1.5 | C$_5$H$_{11}$O | C$_4$H$_9$ | . 49 | — | (. 35.5) | . |
| 1.6 | C$_6$H$_{13}$O | C$_4$H$_9$ | . 31 | — | . 43 | . |
| 1.7 | C$_7$H$_{15}$O | C$_4$H$_9$ | . 45 | — | (. 41.5) | . |
| 1.8 | C$_9$H$_{19}$O | C$_4$H$_9$ | . 47 | — | (. 45) | . |
| 1.9 | CN | C$_4$H$_9$ | . 42 | — | (. 35.5) | . |
| 1.10 | C$_3$H$_7$O | C$_5$H$_{11}$ | . 37.5 | (. 28.5) | . 40.5 | . |
| 1.11 | C$_4$H$_9$O | C$_5$H$_{11}$ | . 40 | — | . 53 | . |
| 1.12 | C$_5$H$_{11}$O | C$_5$H$_{11}$ | . 38 | (. 29) | . 50.5 | . |
| 1.13 | C$_6$H$_{13}$O | C$_5$H$_{11}$ | . 44 | (. 22) | . 56 | . |
| 1.14 | C$_7$H$_{15}$O | C$_5$H$_{11}$ | . 45 | (. 34) | . 55 | . |
| 1.15 | C$_9$H$_{19}$O | C$_5$H$_{11}$ | . 48 | (. 41) | . 56.5 | . |
| 1.16 | CN | C$_5$H$_{11}$ | . 55 | — | (. 48) | . |
| 1.17 | C$_3$H$_7$ | C$_6$H$_{13}$ | . 35 | S$_B$ 41 | — | . |
| 1.18 | C$_4$H$_9$ | C$_6$H$_{13}$ | . 32 | S$_B$ 40.5 | — | . |
| 1.19 | C$_6$H$_{13}$ | C$_6$H$_{13}$ | . 36.5 | . 38.5 | — | . |
| 1.20 | C$_3$H$_7$O | C$_6$H$_{13}$ | . 40 | . 44.5 | — | . |
| 1.21 | C$_4$H$_9$O | C$_6$H$_{13}$ | . 35.5 | . 44 | . 50 | . |
| 1.22 | C$_5$H$_{11}$O | C$_6$H$_{13}$ | . 37 | . 46 | . 49 | . |
| 1.23 | C$_6$H$_{13}$O | C$_6$H$_{13}$ | . 34 | . 45 | . 53 | . |
| 1.24 | C$_7$H$_{15}$O | C$_6$H$_{13}$ | . 45 | . 50.5 | . 55 | . |
| 1.25 | C$_9$H$_{19}$O | C$_6$H$_{13}$ | . 48 | . 53.5 | . 56.5 | . |
| 1.26 | Br | C$_6$H$_{13}$ | . 56 | (. 39) | — | . |
| 1.27 | NO$_2$ | C$_6$H$_{13}$ | . 56 | — | — | . |
| 1.28 | CN | C$_6$H$_{13}$ | . 47 | — | (. 40.5) | . |
| 1.29 | C$_4$H$_9$O | C$_7$H$_{15}$ | . 49 | . 59.5 | — | . |
| 1.30 | C$_6$H$_{13}$O | C$_7$H$_{15}$ | . 37.5 | . 62 | — | . |
| 1.31 | CN | C$_7$H$_{15}$ | . 54 | — | (. 52) | . |
| 1.32 | C$_6$H$_{13}$ | C$_8$H$_{17}$ | . 38 | . 60 | — | . |
| 1.33 | C$_2$H$_5$O | C$_8$H$_{17}$ | . 55 | — | (. 55) | . |
| 1.34 | C$_4$H$_9$ | C$_8$H$_{17}$ | . 43 | . 62 | — | . |
| 1.35 | C$_5$H$_{11}$O | C$_8$H$_{17}$ | . 38 | . 60 | — | . |
| 1.36 | Br | C$_8$H$_{17}$ | . 48.5 | (. 44.5) | — | . |
| 1.37 | CN | C$_8$H$_{17}$ | . 60 | — | (. 51) | . |

TABLE 4

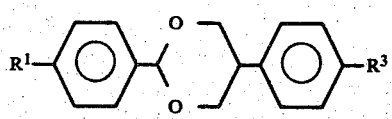

| Compound | R⁴ | R³ | K | S_B | N | I |
|---|---|---|---|---|---|---|
| 2.1 | C₃H₇ | C₄H₉O | . 26 | — | . | |
| 2.2 | C₆H₁₃ | C₄H₉O | . 44 | . 50 | . | |

TABLE 5

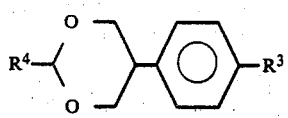

| Compound | R¹ | R³ | K | S | S_B | N | I |
|---|---|---|---|---|---|---|---|
| 3.1 | C₆H₁₃O | C₄H₉O | . 136 | (. 124) | . 166 | — | . |
| 3.2 | CN | C₄H₉O | . 121 | — | — | . 202 | . |
| 3.3 | CN | C₆H₁₃ | . 83 | — | — | . 152 | . |

EXAMPLE 3

Processes for the etherification of 2-[4-hydroxy-phenyl]-5-alkyl-1,3-dioxane 1. 0.1 mol 2-[4-hydroxy-phenyl]-5-alkyl-1,3-dioxane is dissolved in 50 ml abs. tetraydrofuran and reacted with 0.12 mol sodium hydride. After two hours stirring, 0.12 mol of the corresponding alkyl bromide is added, and the reaction mixture is heated for 4 hours to reflux. The solvent is then removed on the rotary evaporator, the reaction product is taken up in 100 ml ether, and the ethereal phase washed twice with 100 ml water. Finally, the solution is dried over Na₂SO₄, the solvent distilled off and the residue recrystallized from methanol (Table 6).

2. 0.1 mol 2-[4-hydroxy-phenyl]-5-alkyl-1,3-dioxane is dissolved in a little benzene and added to a suspension of 0.23 g (0.1 g-atoms) sodium in 100 ml abs. toluene. After heating for three hours to 80° C., the mixture is cooled to room temperature and 0.11 mol alkyl bromide is added. Finally, the mixture is heated for 4 hours to 80° C. and after cooling, the mixture is washed with water, dried over Na₂SO₄, the solvent is distilled off and the reaction product is recrystallized from methanol (Table 6).

3. 0.1 mol 2-[4-hydroxy-phenyl]-5-alkyl-1,3-dioxane is introduced with stirring into a solution of 0.23 g (0.1 g-atoms) sodium in 100 ml abs. ethanol. Then 0.1 mol alkyl bromide is added, and the mixture stirred for four hours heated to reflux. After distilling of the solvent, the residue is taken up in ether, washed, dried over Na₂SO₄, the ether distilled off, and the reaction product recrystallized from methanol.

TABLE 6

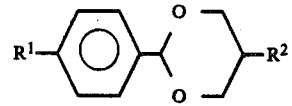

| Compound | R¹ | R² | Yield according to process no. (%) 1 | 2 | 3 | K | S_A | N | I |
|---|---|---|---|---|---|---|---|---|---|
| 1.4 | C₄H₉O | C₄H₉ | 95 | 83 | 85 | . 44 | — | (. 40) | . |
| 1.13 | C₆H₁₃O | C₅H₁₁ | 93 | — | 71 | . 44 | (. 22) | . 56 | . |
| 1.24 | C₇H₁₅O | C₆H₁₃ | 96 | 75 | 78 | . 45 | . 50.5 | . 55 | . |

EXAMPLE 4

Processes for the esterification of 2-[4-hydroxy-phenyl]-5-substituted-1,3-dioxanes and 2-[4-substituted-phenyl]-5-hydroxy-1,3-dioxanes 1. The sodium salt of 0.1 mol 2-[4-hydroxy-phenyl]-5-substituted-1,3-dioxanes (prepared according to Example 3) is reacted in 50 ml abs. tetrahydrofuran, ether, benzene, or toluene with stirring with 0.15 mol of the corresponding acid chloride. The mixture is allowed to stand overnight, the solvent distilled off, the residue taken up in ether, washed, dried over Na₂SO₄ and recrystallized from methanol. The yield approaches 90–95% of theoretical.

2. 0.1 mol 2-[4-hydroxy-phenyl]-5-substituted-1,3-dioxane or 0.1 mol 2-[4-substituted-phenyl]-5-hydroxy-1,3-dioxane is dissolved in 15 ml abs. pyridine and under cooling and stirring reacted with 0.11 mol of the corresponding acid chloride. The reaction mixture is allowed to stand overnight, the solvent then distilled and the residue worked up as described in 1. above. The yield is about 90% of theoretical.

TABLE 7

R—COO—⌬—⧗—R³

| Compound | R | R³ | K | | N | I |
|---|---|---|---|---|---|---|
| 1.38 | C₄H₉ | C₇H₁₅ | . 34 | S_B 68 | — | . |
| 1.39 | C₅H₁₁O | C₇H₁₅ | . 27 | S_A 30 | . 42 | . |
| 1.40 | C₆H₁₃—⌬— | C₇H₁₅ | . 80.5 | — — | . 148.5 | . |
| 1.41 | CH₃O—⌬— | C₇H₁₅ | . 85 | — — | . 193 | . |
| 1.42 | C₅H₁₁O—⌬— | C₇H₁₅ | . 103 | — — | . 174 | . |
| 1.43 | CF₃—⌬— | C₇H₁₅ | . 113 | S_A 166.5 | — | . |
| 1.44 | NC—⌬— | C₇H₁₅ | . 129 | S_A 182.5 | . 221 | . |

TABLE 8

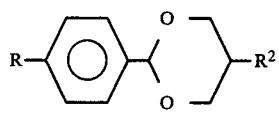

| Compound | R¹ | R² | K | S | N | I |
|---|---|---|---|---|---|---|
| 1.45 | $NO_2$ | $-OOC-\bigcirc-OC_6H_{13}$ | . 143 | — | . 159 | . |
| 1.46 | $C_6H_{13}O$ | $-OOC-\bigcirc-NO_2$ | . 132 | — | — | . |

EXAMPLE 5

Procedure for synthesis of 5-alkyl-2-[4-(β-cyanoethyloxy)-phenyl]-1,3-dioxane and 5-[β-cyanoethyloxy]-2-[4-substituted-phenyl]-1,3-dioxane To a solution of 0.1 mol 5-alkyl-2-[4-hydroxyphenyl]-1,3-dioxane or 0.1 mol 2-[4-substituted-phenyl]-5-hydroxy-1,3-dioxane at 35° to 40° C., 300 mg sodium methylate and 0.12 mol acrylonitrile are added. The reaction mixture is stirred for 6 hours at room temperature and finally extracted with ether.

The ether phase is washed, dried over potash, and the solvent distilled off. The residue is recrystallized from methanol. The yields are 54–80% of theoretical.

EXAMPLE 6

5-n-hexyl-2-[4-cyano-phenyl]-1,3-dioxane (Compound No. 1.28)

This compound is suitable for use in electro-optical components based on twisted nematic layers and exhibits the following properties.

Measurement temperature: 35° C.;
Swell potential: 0.65 V/50 Hz;
Onset time $t_E$ (50%)=376 ms at U=1.3 V/50 Hz;
Decay time $t_A$ (50%)=190 ms, layer thickness 21 μm.

EXAMPLE 7

Compound No. 1.31 (Table 3) exhibits a strongly positive DK-anisotropy of Δε= +11 10° C. below the clarification point.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A compound of the formula:

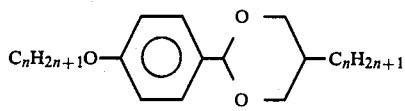

wherein n=1 to 10.

2. A compound of the formula:

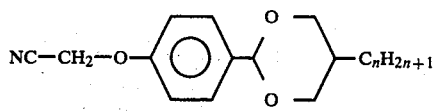

wherein n=1 to 10.

3. A liquid crystalline composition comprising a mixture of at least one compound selected from the group consisting of liquid crystalline substances, non-liquid crystalline substances, and mixtures thereof, and a compound of the general formula:

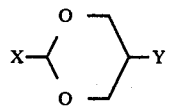

wherein X = R¹—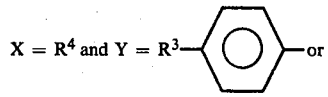—and Y = R², or

X = R⁴ and Y = R³—◯—or

X = R¹—◯—and Y = R³—◯—and wherein R¹ = $C_nH_{2n+1}$; $C_nH_{2n+1}O$; $C_nH_{2n+1}COO$; $C_nH_{2n+1}OCOO$; F; Cl; Br; OH;

R² = $C_nH_{2n+1}$;OOC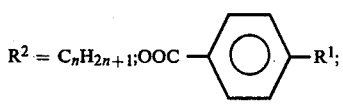R¹;

R³ = $C_nH_{2n+1}$; $C_nH_{2n+1}O$; $CF^3$; CN; $NO_2$;
R⁴ = $C_nH_{2n+1}$, and n=1 to 10.

* * * * *